US010861120B1

(12) United States Patent
Weir et al.

(10) Patent No.: US 10,861,120 B1
(45) Date of Patent: Dec. 8, 2020

(54) DYNAMIC ROUTING DURING MUSTER

(71) Applicant: Royal Caribbean Cruises Ltd., Miami, FL (US)

(72) Inventors: Nick Weir, Davie, FL (US); Joey Hasty, Miami, FL (US); Josh Nakaya, Glendale, CA (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

(21) Appl. No.: 16/706,020

(22) Filed: Dec. 6, 2019

(51) Int. Cl.
*G06Q 90/00* (2006.01)
*G01C 21/20* (2006.01)
*G08B 7/06* (2006.01)
*H04W 4/33* (2018.01)
*H04W 4/024* (2018.01)
*H04W 4/02* (2018.01)
*H04W 4/029* (2018.01)
*G08B 21/02* (2006.01)

(52) U.S. Cl.
CPC ......... *G06Q 90/205* (2013.01); *G01C 21/206* (2013.01); *G08B 7/062* (2013.01); *G08B 7/066* (2013.01); *G08B 21/0222* (2013.01); *G08B 21/0258* (2013.01); *G08B 21/0266* (2013.01); *H04W 4/023* (2013.01); *H04W 4/024* (2018.02); *H04W 4/029* (2018.02); *H04W 4/33* (2018.02)

(58) Field of Classification Search
CPC ..... G06Q 90/05; G06Q 90/205; H04W 4/029; H04W 4/023; H04W 4/33; H04W 4/024; G08B 7/062; G08B 7/066; G08B 21/0258; G08B 21/0222; G08B 21/0266; G01C 21/206
See application file for complete search history.

(56) References Cited

U.S. PATENT DOCUMENTS

| | | | |
|---|---|---|---|
| 6,801,907 B1* | 10/2004 | Zagami | G07C 9/253 |
| 9,159,212 B1* | 10/2015 | Hadsall, Sr. | G08B 21/22 |
| 10,582,335 B1* | 3/2020 | Weir | H04W 4/80 |
| 2007/0051294 A1* | 3/2007 | Pike | B63G 8/001 114/348 |
| 2010/0282839 A1* | 11/2010 | Zura | G06Q 10/00 235/382 |
| 2011/0109434 A1* | 5/2011 | Hadsall, Sr. | G08B 21/0275 340/8.1 |
| 2013/0300560 A1* | 11/2013 | Hadsall, Sr. | G08B 26/007 340/539.13 |

(Continued)

*Primary Examiner* — Russell Frejd
(74) *Attorney, Agent, or Firm* — Steven M. Greenberg, Esq.; Shutts & Bowen LLP

(57) ABSTRACT

Embodiments of the present invention provide a method, system and computer program product for dynamic routing during muster. In an embodiment of the invention, a method for dynamic routing during distributed muster includes assigning a muster station to a passenger on a vessel and thereafter, locating the passenger at a location on the vessel during a muster event. Once the passenger has been located on the vessel, a path is computed between the location and the muster station and turn by turn instructions assembled for the computed path. Finally, the turn by turn instructions are transmitted to a mobile computing device of the passenger, such as a smart phone or smart watch, for display in the mobile computing device of the passenger during the muster event.

11 Claims, 2 Drawing Sheets

(56) References Cited

U.S. PATENT DOCUMENTS

| | | | | |
|---|---|---|---|---|
| 2014/0340220 A1* | 11/2014 | Meraz | .................. | G08B 26/008 340/539.13 |
| 2018/0089785 A1* | 3/2018 | Imoto | .................. | G01C 21/206 |
| 2019/0339351 A1* | 11/2019 | Sundia | .................. | G01S 5/0252 |
| 2019/0340560 A1* | 11/2019 | Sundia | ........... | G06Q 10/063114 |

* cited by examiner

DYNAMIC ROUTING DURING MUSTER

BACKGROUND OF THE INVENTION

Field of the Invention

The present invention relates to the field of muster management in an ocean-going vessel and more particularly to coordinating passenger muster in a cruise ship.

Description of the Related Art

Muster refers to the organized and pre-planned congregation of different passengers on an ocean-going vessel at different locations of the ocean-going vessel in response to, or in preparation for, a response to an emergency condition in the ocean-going vessel. Traditionally, in the context of a passenger cruise ship, a muster drill is performed at the beginning of the cruise before the cruise ship departs or shortly thereafter. During the muster drill, each individual passenger reports to an assigned muster station—a specific location on the vessel. A crew member then confirms the presence of each passenger expected to be present at the specific location during the muster drill so that all passengers may be accounted for in the event of an actual emergency and a resultant actual muster.

The muster process is particularly important because, with different clusters of passengers pre-positioned at specific, predetermined locations, an orderly evacuation of the vessel may be achieved if required, or at least all passengers can be accounted for and the location of the passengers managed relative to a location of an emergency condition aboard the vessel. Prior to an emergency, a muster drill is important as the muster drill introduces to each passenger the precise location at which the passenger is required to report in the event of an actual emergency as well as demonstrates important safety information such as the identification of life jackets and warning signals the guest might hear. Consequently, in light of the prospective frenetic activity of muster during an actual emergency, it is desirable to have confidence that the passengers each will be able to traverse the vessel to the assigned muster station.

Despite the desire for a chaos free muster, the reality remains that during an emergency condition—even a minor emergency—general confusion may arise simply owing to the complexity of size and architecture of a vessel and the mass movement of so many passengers to different locations within a short period of time. Indeed, during a muster event, whether a drill or actual, the resulting process can be confusing for some—particularly the elderly and children—both of whom often require additional assistance locating and moving towards assigned muster stations. The foregoing difficulties may be compounded when the muster event occurs during nighttime when passengers awake from sleep and may not be completely aware of unfamiliar surroundings. Crew members generally are trained to supply such assistance, but lapses remain possible.

BRIEF SUMMARY OF THE INVENTION

Embodiments of the present invention address deficiencies of the art in respect to muster on a vessel and provide a novel and non-obvious method, system and computer program product for dynamic routing during muster. In an embodiment of the invention, a method for dynamic routing during a muster event includes assigning a muster station to a passenger on a vessel and thereafter, locating the passenger at a location on the vessel during a muster event. Once the passenger has been located on the vessel, a path is computed between the location and the muster station and turn by turn instructions assembled for the computed path. Finally, the turn by turn instructions are transmitted to a mobile computing device of the passenger for display in the mobile computing device of the passenger during the muster event. In this regard, the mobile computing device can be smart phone or a table computer. As well, the mobile computing device can be a trackable wearable device such as a smart watch, smart pendent or smart bracelet.

In one aspect of the embodiment, the passenger is located by geo-locating the mobile computing device of the passenger on the vessel in respect to one or more access points positioned throughout the vessel. In another aspect of the embodiment, the display includes a summary indication of a number of decks to traverse between the location and the muster station. In yet another aspect of the embodiment, the display includes an estimated time to arrive at the muster station. In even yet another aspect of the embodiment, during the muster event, the passenger may be re-assigned to a different muster station from the assigned muster station such that the path is computed based upon the different muster station and not the assigned muster station. As well, an alert may be included in the display indicating a re-assignment of the assigned muster station to the different muster station.

In another embodiment of the invention, a data processing system is disposed on a vessel and adapted for dynamic routing during a muster event. The system includes a host computing platform having one or more computers, each with memory and at least one processor, a multiplicity of wireless access points positioned on a vessel and coupled to the host computing platform and passenger location logic executing in the memory of the host computing platform and receiving location data from the wireless access points for different mobile computing devices present on the vessel and associated with respectively different passengers on the vessel. The system yet further includes a dynamic muster routing module. The module includes computer program instructions configured for execution in the host computing platform so as to perform an assignment of a muster station to a passenger on a vessel, a location of one of the passengers at a location on the vessel during a muster event according to portions of the location data correlating to one of the different mobile computing devices of the one of the passengers, a computation of a path between the location and the muster station and an assembly of turn by turn instructions for the computed path and a transmission of the turn by turn instructions to the correlated one of the different mobile computing devices of the one of the passengers for display in the correlated one of the different mobile computing devices of the one of the passengers during the muster event.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the invention provide for dynamic routing during muster in an ocean-going vessel. In accordance with an embodiment of the invention, different muster stations are assigned to different passengers present on the vessel. During the occurrence of a muster event on the vessel, each of the passengers may be located on the vessel, for instance by geo-locating a corresponding mobile device of each passenger such as a smart phone, smart watch, smart bracelet or smart pendant, and a different path for each of the passengers is computed as between each passenger and an assigned muster station. Turn by turn directives may then be computed for each computed path and the turn by turn directives for each computed path are then transmitted each to a mobile computing device of a corresponding passenger. In this way, during an actual muster event, some of the confusion arising from the muster event may be remediated through the guidance provided to the mobile computing device of each passenger.

Figure 1:
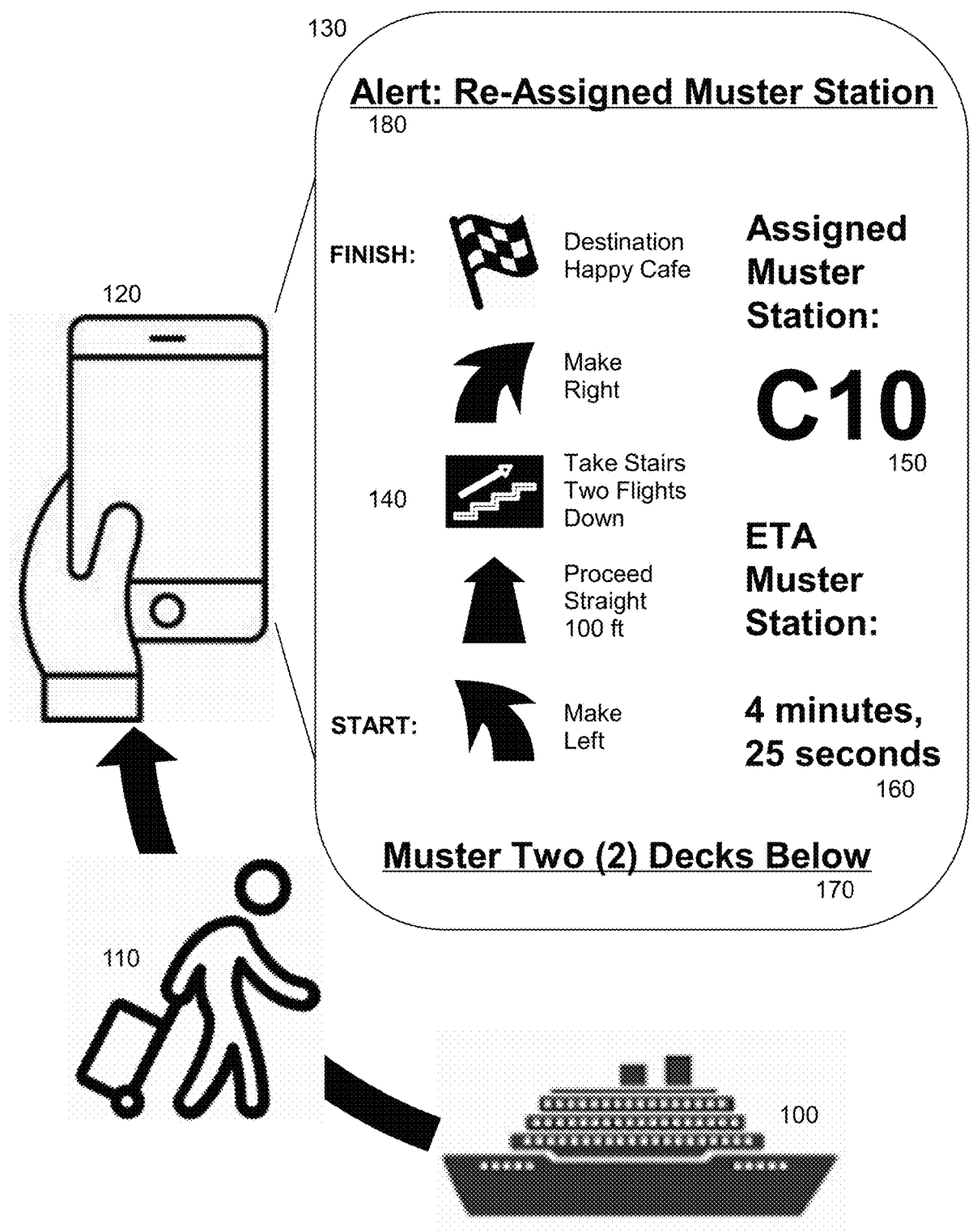
- FIG. 1 is a pictorial illustration of a process for dynamic routing during muster on a vessel.

In further illustration, FIG. 1 pictorially shows a process for dynamic routing during muster on a vessel. As shown in FIG. 1, a passenger 110 on board a vessel 100 carries a mobile device 120 such as a smart phone, smart watch, smart pendant or smart bracelet, each with an embedded computer and display and network communications circuitry. The mobile device 120 is registered with the vessel 100 in association with the passenger 110. Furthermore, the passenger 110 is registered with the vessel 100 in association with a particular muster station on board the vessel 100. Thereafter, during a muster event on the vessel 100, a geo-location of the mobile device 120 on the vessel 100 is determined, for instance, by identifying one of a multiplicity of wireless access points present on the vessel 100 with which the mobile device 120 has registered and correlating the location of the mobile device 120 the location of the identified wireless access point.

Thereafter, a path is computed on the vessel 100 between the location of the mobile device 120 and a location of the muster station associated with the passenger 110. Optionally, the muster station associated with the passenger 110 may be re-assigned dynamically at the time of the muster event, for instance to the extent that the originally associated muster station is proximate to a hazardous condition present on the vessel 100, or if part of the path is obstructed in consequence of a hazardous condition on the vessel 100. In this instance the path is computed on the vessel 100 between the location of the mobile device 120 and the location of the re-assigned muster station. In either circumstance, turn by turn directives are then assembled for the path. Then, a display 130 is presented in the mobile device 120.

Specifically, the display 130 includes an iconic representation 140 of the turn-by-turn directives computed for the path. As well, the display 130 includes an indication 150 of the assigned (or re-assigned) muster station. Optionally, if the muster station has been re-assigned, an alert 180 is presented in the display 130 indicating to the passenger that the re-assigned muster station is different than the originally assigned muster station. As well, a count 170 of a number of decks disposed between the location of the passenger 110 and the assigned (or re-assigned) muster station is presented. Finally, an estimated time of arrival 160 of the passenger 110 at the muster station is computed according to the path, an average speed of walking of the passenger 110 and pre-determined times for traversing stairwells. Optionally, the estimated time of arrival 160 can be dynamically computed periodically or continuously based upon a re-determined location of the mobile device 120 during the muster event.

Figure 2:
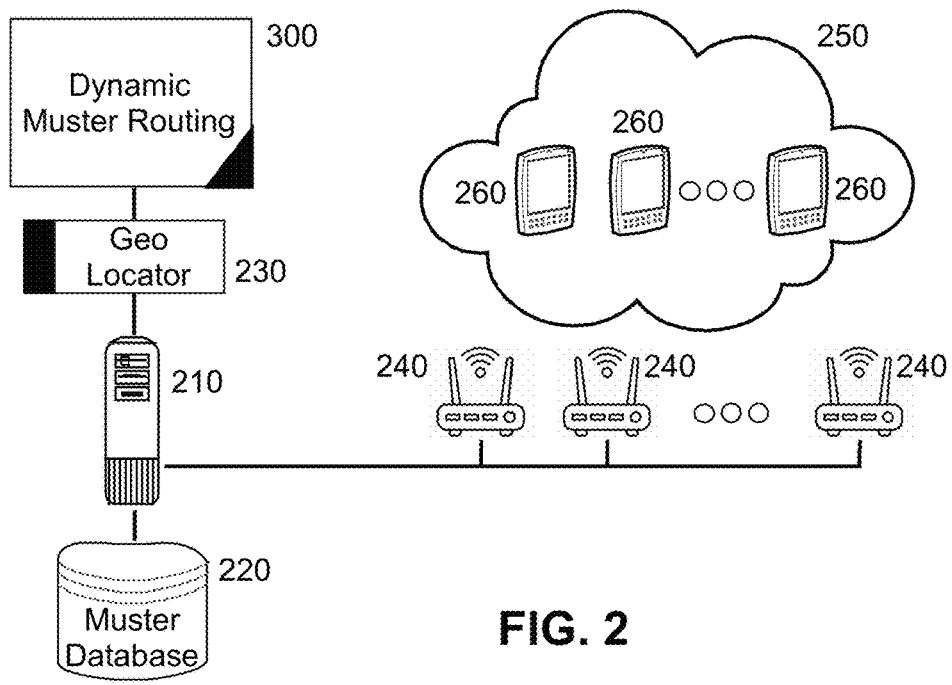
FIG. 2 is a schematic illustration of a data processing system disposed on a vessel and configured for dynamic routing during muster; and, FIG. 3 is a flow chart illustrating a process for dynamic routing during muster on a vessel.

The process described in connection with FIG. 1 can be implemented in a data processing system. In further illustration, FIG. 2 schematically illustrates a data processing system disposed on a vessel and configured for dynamic routing during muster. The system includes a host computing system 210 that includes one or more computers, each with memory and at least one processor. The host computing system 210 is communicatively coupled to an array of wireless access points 240 each providing a wireless computer communications network 250 in which one or more mobile computing devices 260 can communicate with the host computing system 210. The host computing system further includes a geo-locator 230 adapted to locate each one of the mobile computing devices 260 based upon an association with a respective one of the wireless access points 240. Finally, the system includes a dynamic muster routing module 300 communicatively coupled to the geo-locator 230 and including computer program instructions executing in the host computing platform 210.

The computer program instructions during execution process a muster event by identifying for each passenger on the vessel, a muster station assigned in muster database 220. The program instructions further determine from the geo-locator 230 a contemporaneous location on the vessel of each of the mobile computing devices 260. The program instructions yet further compute a path for each of the mobile computing devices 260 from a corresponding contemporaneous location on the vessel to an assigned muster station and retrieve a set of turn by turn directives for each of the computed paths. Finally, the program instructions transmit the turn by turn directives for each corresponding one of the passengers for display in a respective one of the mobile computing devices 260.

Optionally, the program instructions compute an estimated time of arrival for each of the passengers at an assigned muster station and direct the display of the estimated time of arrival in a corresponding one of the mobile computing devices 260. As another option, an assigned muster station is displayed in each of the mobile computing devices 260. As yet another option, a number of decks to be traversed by each passenger according to the computed path is displayed in a corresponding one of the mobile computing devices 260. As even yet another option, an indication of re-assignment from one muster station to another is displayed in a particular one of the mobile computing devices 260.

Figure 3:
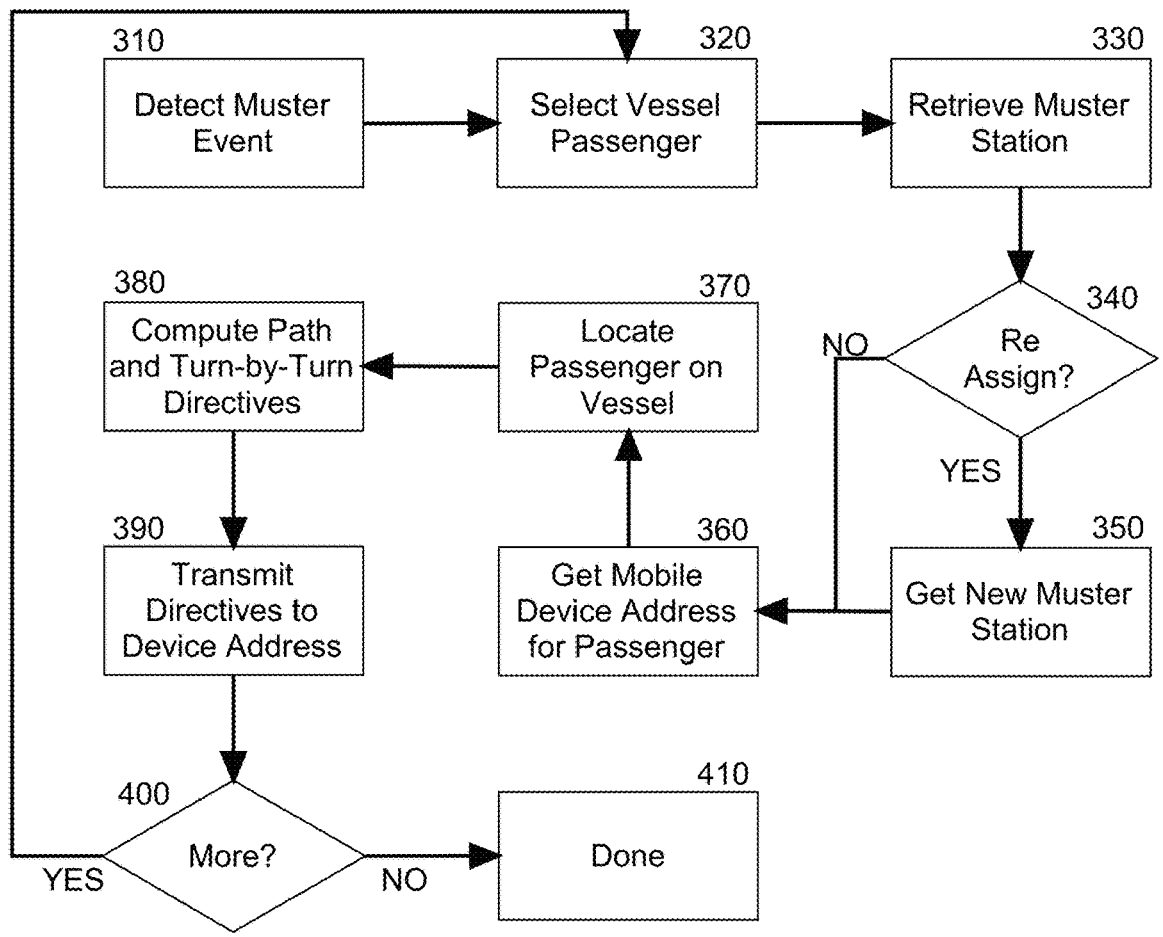

In even yet further illustration of the operation of the dynamic muster routing module 300, FIG. 3 is a flow chart illustrating a process for dynamic routing during muster on a vessel. Beginning in block 310, a muster event is detected. In response, in block 320, a vessel passenger is selected for processing and in block 330, a muster station assigned to the selected vessel passenger is retrieved. In decision block 340, it is determined whether or not to re-assign the assigned muster station to a re-assigned muster station. If so, in block 350 a new muster station is retrieved for the vessel passenger. In either circumstance, in block 360, a mobile computing device address of a mobile computing device for the vessel passenger is determined and in block 370, a location of the mobile computing device is identified, for instance based upon an association of the mobile computing device address and a particular wireless access point of known location on the vessel.

In block 380, a path between the location of the mobile the computing device and the assigned muster station is computed. Then, turn by turn directives for the path are retrieved and in block 390, the turn by turn directives are transmitted to the address of the mobile computing device for display in a display of the mobile computing device. Thereafter, in decision block 400, it is determined if additional vessel passengers remain to be processed. If so, the process continues through block 320 with the selection of a next vessel passenger for processing. When no further vessel passengers remain to be processed in decision block 400, in block 410, the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamic routing during distributed muster, the method comprising:

assigning a muster station to a passenger on a vessel;
locating the passenger at a location on the vessel during a muster event;
computing both a path between the location and the muster station and also computing a count of a number of decks between the location of the passenger on the vessel and the muster station;
assembling turn by turn instructions for the computed path; and,
transmitting both the turn by turn instructions and also the computed count to a mobile computing device of the passenger for display in the mobile computing device of the passenger during the muster event.

2. The method of claim 1, wherein the passenger is located by geo-locating the mobile computing device of the passenger on the vessel in respect to one or more access points positioned throughout the vessel.

3. The method of claim 1, wherein the display includes an estimated time to arrive at the muster station.

4. The method of claim 1, further comprising:
re-assigning the passenger to a different muster station from the assigned muster station during the muster event;
computing the path based upon the different muster station and not the assigned muster station; and,
including in the display, an alert indicating a re-assignment of the assigned muster station to the different muster station.

5. A data processing system disposed on a vessel and adapted for dynamic routing during a muster event, the system comprising:
a host computing platform comprising one or more computers, each with memory and at least one processor;
a multiplicity of wireless access points positioned on a vessel and coupled to the host computing platform;
passenger location logic executing in the memory of the host computing platform and receiving location data from the wireless access points for different mobile computing devices present on the vessel and associated with respectively different passengers on the vessel; and,
a dynamic muster routing module comprising computer program instructions configured for execution in the host computing platform, the instructions performing:
assigning a muster station to a passenger on a vessel;
locating one of the passengers at a location on the vessel during a muster event according to portions of the location data correlating to one of the different mobile computing devices of the one of the passengers;
computing both a path between the location and the muster station and also computing a count of a number of decks between the location of the passenger on the vessel and the muster station;
assembling turn by turn instructions for the computed path; and,
transmitting the turn by turn instructions to the correlated one of the different mobile computing devices of the one of the passengers for display in the correlated one of the different mobile computing devices of the one of the passengers during the muster event.

6. The system of claim 5, wherein the display includes an estimated time to arrive at the muster station.

7. The system of claim 5, wherein the program instructions further perform:
re-assigning the one of the passengers to a different muster station from the assigned muster station during the muster event;
computing the path based upon the different muster station and not the assigned muster station; and,
including in the display, an alert indicating a re-assignment of the assigned muster station to the different muster station.

8. A computer program product for dynamic routing during distributed muster, the computer program product including a non-transitory computer readable storage medium having program instructions embodied therewith, the program instructions executable by a device to cause the device to perform a method including:
assigning a muster station to a passenger on a vessel;
locating the passenger at a location on the vessel during a muster event;
computing both a path between the location and the muster station and also computing a count of a number of decks between the location of the passenger on the vessel and the muster station;
assembling turn by turn instructions for the computed path; and,
transmitting the turn by turn instructions to a mobile computing device of the passenger for display in the mobile computing device of the passenger during the muster event.

9. The computer program product of claim 8, wherein the passenger is located by geo-locating the mobile computing device of the passenger on the vessel in respect to one or more access points positioned throughout the vessel.

10. The computer program product of claim 8, wherein the display includes an estimated time to arrive at the muster station.

11. The computer program product of claim 8, wherein the method further includes:
re-assigning the passenger to a different muster station from the assigned muster station during the muster event;
computing the path based upon the different muster station and not the assigned muster station; and,
including in the display, an alert indicating a re-assignment of the assigned muster station to the different muster station.

* * * * *